(12) United States Patent
Tchon et al.

(10) Patent No.: US 10,710,740 B1
(45) Date of Patent: Jul. 14, 2020

(54) SONIC BOOM DISPLAY SYSTEMS AND METHODS

(71) Applicant: Rockwell Collins, Inc., Cedar Rapids, IA (US)

(72) Inventors: Joseph L. Tchon, Cedar Rapids, IA (US); Laura M. Smith-Velazquez, Mount Airy, MD (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 269 days.

(21) Appl. No.: 15/591,898

(22) Filed: May 10, 2017

(51) Int. Cl.
| B64D 43/00 | (2006.01) |
| G08G 5/00 | (2006.01) |
| G08B 6/00 | (2006.01) |
| G06F 3/0484 | (2013.01) |

(52) U.S. Cl.
CPC .............. B64D 43/00 (2013.01); G08B 6/00 (2013.01); G08G 5/0021 (2013.01); G06F 3/04842 (2013.01); G06F 3/04847 (2013.01)

(58) Field of Classification Search
CPC ........ G08B 6/00; B64D 43/00; G08G 5/0021; G06F 3/04842; G06F 3/04847
See application file for complete search history.

(56) References Cited

U.S. PATENT DOCUMENTS

| 3,737,119 | A | * | 6/1973 | Cheng | B64C 23/04 244/1 N |
| 7,599,805 | B2 | * | 10/2009 | Pilon | G01H 17/00 244/1 N |
| 8,145,366 | B1 | * | 3/2012 | Haering, Jr. | G01C 23/00 244/1 N |
| 10,209,122 | B1 | * | 2/2019 | Suddreth | B64D 43/00 |
| 2005/0098681 | A1 | * | 5/2005 | Berson | B64C 30/00 244/1 N |
| 2008/0228413 | A1 | * | 9/2008 | Pilon | G01H 17/00 702/56 |
| 2016/0084621 | A1 | * | 3/2016 | Bergen | F42B 3/06 102/202.7 |
| 2016/0163203 | A1 | * | 6/2016 | Wang | G05D 1/0214 701/3 |
| 2016/0347472 | A1 | * | 12/2016 | Williams | B64D 45/00 |
| 2017/0315706 | A1 | * | 11/2017 | Helppi | G06F 3/04845 |

* cited by examiner

*Primary Examiner* — Russell Frejd
(74) *Attorney, Agent, or Firm* — Suiter Swantz pc llo

(57) ABSTRACT

A system includes a display device, a haptic feedback device coupled to the display device, and a control circuit. The control circuit is configured to receive an indication of a sonic boom. The control circuit is configured to cause the display device to display a visual representation of the indication of the sonic boom. The control circuit is configured to cause the haptic feedback device to output feedback corresponding to the sonic boom.

18 Claims, 4 Drawing Sheets

SONIC BOOM DISPLAY SYSTEMS AND METHODS

BACKGROUND

The inventive concepts disclosed herein relate generally to the field of avionics systems. More particularly, embodiments of the inventive concepts disclosed herein relate to systems and methods for providing sonic boom information with avionics displays.

Supersonic flight can facilitate transportation between distant locations at much greater speeds than currently used by most aircraft, including commercial aircraft. However, aircraft travelling at supersonic speeds are susceptible to generating sonic booms associated with shock waves created by the aircraft travelling faster than the speed of sound. Sonic booms can have adverse effects, particularly on ground-based structures and observers, limiting the viability of supersonic flight.

SUMMARY

In one aspect, the inventive concepts disclosed herein are directed to a system. The system includes a display device, a haptic feedback device coupled to the display device, and a control circuit. The control circuit is configured to receive an indication of a sonic boom. The control circuit is configured to cause the display device to display a visual representation of the indication of the sonic boom. The control circuit is configured to cause the haptic feedback device to output feedback corresponding to the sonic boom.

In a further aspect, the inventive concepts disclosed herein are directed to an airborne platform. The airborne platform includes a flight navigation system, a display device, a feedback device, and a control circuit. The flight navigation system is configured to store a flight plan. The control circuit is configured to receive an indication of a sonic boom, cause the display device to display a visual representation of the indication of the sonic boom, and cause the feedback device to output feedback corresponding to the sonic boom.

In a further aspect, the inventive concepts disclosed herein are directed to a method. The method includes receiving, at a control circuit, an indication of a sonic boom. The method includes causing, by the control circuit, a display device to display a visual representation of the indication of the sonic boom. The method includes causing, by the control circuit, a feedback device to output feedback corresponding to the sonic boom.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1A:
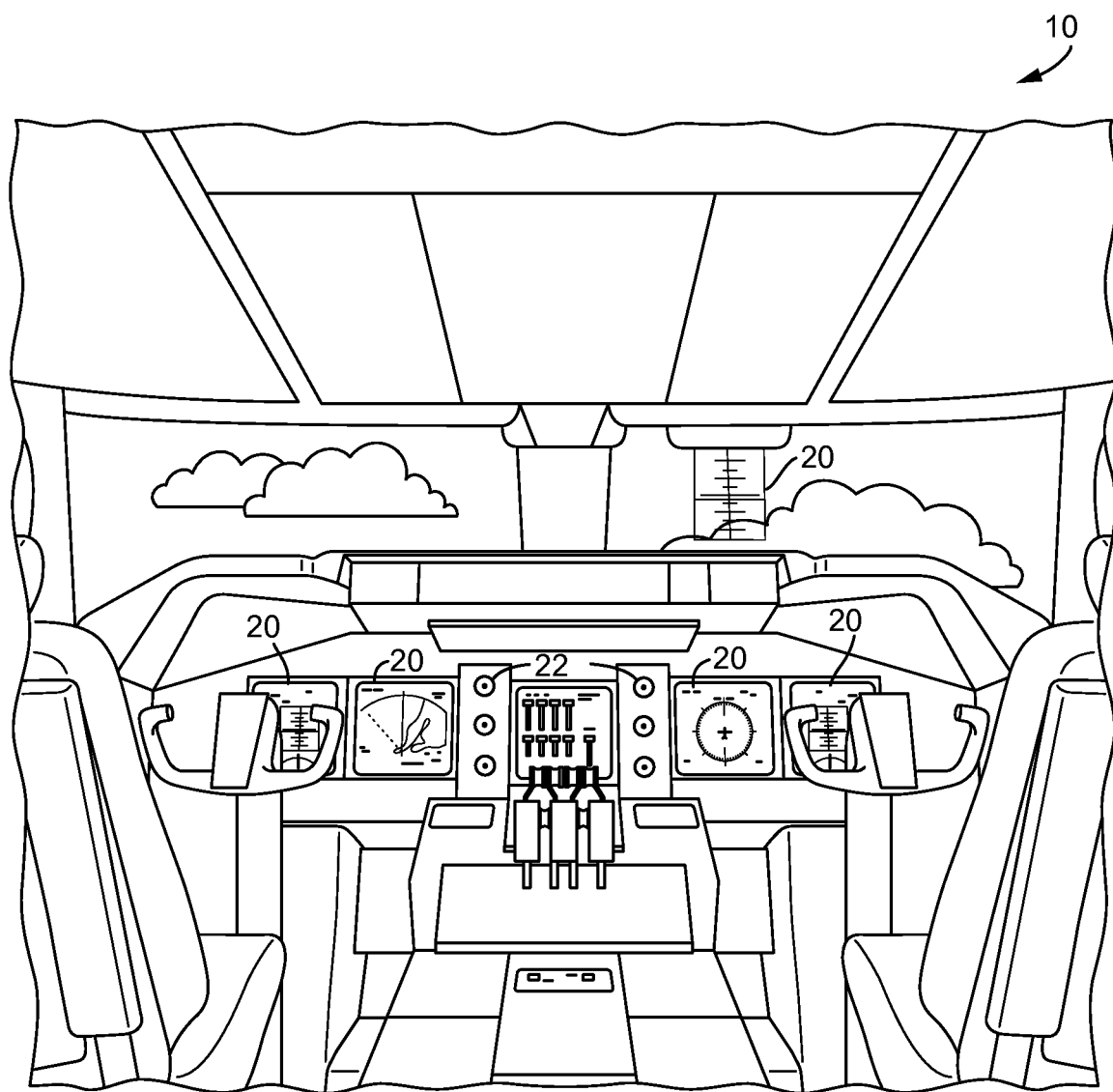
FIG. 1A is a schematic illustration of an exemplary embodiment of an aircraft control center according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Broadly, embodiments of the inventive concepts disclosed herein are directed to systems and methods for sonic boom displays and feedback devices. The inventive concepts disclosed herein can be utilized in a number of control systems for various types of electronic avionics applications for airborne platforms (e.g., aircraft), including but not limited to flight control and autopilot systems, navigation systems, flight display systems, communications systems, radar systems, electric power systems, engine control systems, and monitor warning systems. While the present disclosure describes systems and methods implementable for an airborne platform, the inventive concepts disclosed herein may be used in any type of environment (e.g., in another aircraft, a spacecraft, an autonomous vehicle, a ground-based vehicle, a water-based or underwater vehicle, a subsurface or subterranean vehicle, a satellite, an aeronautical platform, or in a non-vehicle application such as a stationary communications, sensing, or testing system, a ground-based display system, an air traffic control system, a radar system, a virtual display system).

In some embodiments, a system includes a display device, a haptic feedback device coupled to the display device, and a control circuit. The control circuit is configured to receive an indication of a sonic boom. The control circuit is configured to cause the display device to display a visual representation of the indication of the sonic boom. The control circuit is configured to cause the haptic feedback device to output feedback corresponding to the sonic boom.

The system can be integrated with an airborne platform or other platform as described herein. For example, the feedback and display devices described herein can be associated with an aircraft cockpit display of the airborne platform.

Systems manufactured in accordance with the inventive concepts disclosed herein can improve the operation of aircraft and other platforms by providing real-time awareness of how supersonic flight can cause sonic booms, as well as how to avoid flight paths leading to sonic booms. For example, a system may provide feedback indicating locations and magnitudes (e.g., pressure levels) of sonic booms depending on a current or expected flight path, which can help a pilot or other user select a flight path along which sonic booms may be reduced, minimized, or nullified. The feedback may allow a pilot or other user to see and feel where sonic booms will impact ground locations, including changing feedback based on desired or potential changes to aircraft trajectory. For example, utilizing the display that is showing the sonic boom path, a pilot or ground personnel may grab a sonic boom indicator device (e.g., a joystick or other device configured to provide haptic feedback) and move it in any direction, such as to request or test a trajectory change. The system can provide haptic feedback such that the user can feel the effects of the sonic boom (e.g., potential sonic boom) by moving the sonic boom indicator; for example, higher levels of vibration or oscillation might indicate that the boom will become more intense by changing the flight path in the selected direction.

Referring to FIG. 1A, a perspective view schematic illustration of an aircraft control center or cockpit 10 is shown accordingly to an exemplary embodiment of the inventive concepts disclosed herein. The aircraft control center 10 can be configured for an aircraft operator or other user to interact with avionics systems of an airborne platform. The aircraft control center 10 may include one or more flight displays 20 and one or more user interface ("UI") elements 22. The flight displays 20 may be implemented using any of a variety of display technologies, including CRT, LCD, organic LED, dot matrix display, and others. The flight displays 20 may be navigation (NAV) displays, primary flight displays, electronic flight bag displays, tablets such as iPad® computers manufactured by Apple, Inc. or tablet computers, synthetic vision system displays, head down displays (HDDs), head up displays (HUDs) with or without a projector, wearable displays, watches, Google Glass®. The flight displays 20 may be used to provide information to the flight crew, thereby increasing visual range and enhancing decision-making abilities. One or more of the flight displays 20 may be configured to function as, for example, a primary flight display (PFD) used to display altitude, airspeed, vertical speed, and navigation and traffic collision avoidance system (TCAS) advisories. One or more of the flight displays 20 may also be configured to function as, for example, a multi-function display used to display navigation maps, weather radar, electronic charts, TCAS traffic, aircraft maintenance data and electronic checklists, manuals, and procedures. One or more of the flight displays 20 may also be configured to function as, for example, an engine indicating and crew-alerting system (EICAS) display used to display critical engine and system status data. Other types and functions of the flight displays 20 are contemplated as well. According to various exemplary embodiments of the inventive concepts disclosed herein, at least one of the flight displays 20 may be configured to display a visual representation of a widget generated according to the systems and methods of the inventive concepts disclosed herein.

In some embodiments, the flight displays 20 may provide an output based on data received from a system external to an aircraft, such as a ground-based weather radar system, satellite-based system, or from a system of another aircraft. In some embodiments, the flight displays 20 may provide an output from an onboard aircraft-based weather radar system, LIDAR system, infrared system or other system on an aircraft. For example, the flight displays 20 may include a weather display, a weather radar map, and a terrain display. In some embodiments, the flight displays 20 may provide an output based on a combination of data received from multiple external systems or from at least one external system and an onboard aircraft-based system. The flight displays 20 may include an electronic display or a synthetic vision system (SVS). For example, the flight displays 20 may include a display configured to display a two-dimensional (2-D) image, a three dimensional (3-D) perspective image of terrain and/or weather information, or a four dimensional (4-D) display of weather information or forecast information. Other views of terrain and/or weather information may also be provided (e.g., plan view, horizontal view, vertical view). The views may include monochrome or color graphical representations of the terrain and/or weather information. Graphical representations of weather or terrain may include an indication of altitude of the weather or terrain or the altitude relative to an aircraft.

The UI elements 22 may include, for example, dials, switches, buttons, touch screens, keyboards, a mouse, joysticks, cursor control devices (CCDs), menus on Multi-Functional Displays (MFDs), or other multi-function key pads certified for use with avionics systems. The UI elements may be incorporated by the flight displays 20 (e.g., the UI elements 22 may appear on or be part of the flight displays 20). The UI elements 22 may be configured to, for example, allow an aircraft crew member to interact with various avionics applications and perform functions such as data entry, manipulation of navigation maps, and moving among and selecting checklist items. For example, the UI elements 22 may be used to adjust features of the flight displays 20, such as contrast, brightness, width, and length. The UI elements 22 may also (or alternatively) be used by an aircraft crew member to interface with or manipulate the displays of the flight displays 20. For example, the UI elements 22 may be used by aircraft crew members to adjust the brightness, contrast, and information displayed on the flight displays 20. The UI elements 22 may additionally be used to acknowledge or dismiss an indicator provided by the flight displays 20. The UI elements 22 may be used to correct errors on the flight displays 20. The UI elements 22 may also be used to adjust the radar antenna tilt, radar display gain, and to select vertical sweep azimuths. Other UI elements 22, such as indicator lights, displays, display elements, and audio alerting devices, may be configured to warn of potentially threatening conditions such as severe weather, terrain, and obstacles, such as potential collisions with other aircraft.

Figure 1B:
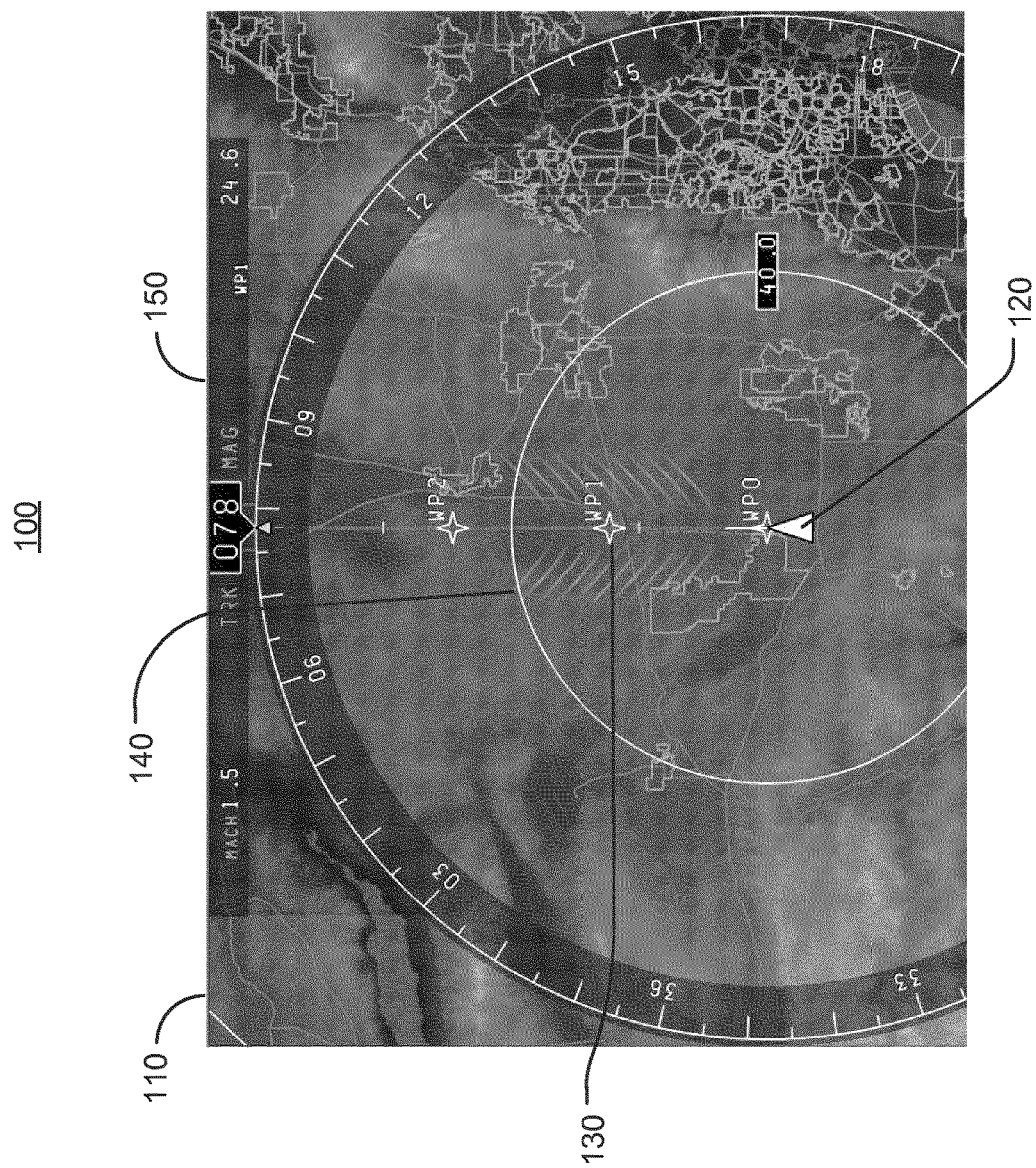
FIG. 1B is a schematic diagram of an exemplary embodiment of a sonic boom display according to the inventive concepts disclosed herein.

Referring now to FIG. 1B, a schematic diagram of a sonic boom display 100 is shown according to an exemplary embodiment of the inventive concepts disclosed herein. The sonic boom display 100 can be displayed using various display devices described herein (e.g., flight displays 20, a HDD). The sonic boom display 100 can include a map 110. The map 110 can include terrain features, water features, weather information, radar information, or any other information relevant to movement of a platform.

The sonic boom display 100 can include a platform indicator 120 indicating a location of a platform (e.g., airborne platform), such as a platform including a display device displaying the sonic boom display 100. The platform indicator 120 may indicate a direction of travel (e.g., heading) of the platform. For example, as shown in FIG. 1B, the platform indicator 120 includes a triangular shape having a first vertex spaced further from second and third vertices, indicating a direction of travel from the second and third vertices towards the first vertex.

The sonic boom display 100 can include flight plan information, such as waypoints 130. Waypoints 130 may be retrieved from a flight plan (e.g., a flight plan stored in or generated by navigation system 240 described with reference to FIG. 2 below). Waypoints 130 may be generated based on user input (e.g., user input received via UI elements described with reference to FIG. 1A).

The sonic boom display 100 includes at least one sonic boom indicator 140. The sonic boom indicator 140 can indicate at least one of a pressure level or a ground location of a sonic boom generated by a platform associated with the sonic boom display 100. For example, the sonic boom indicator 140 can indicate ground location(s) at which a sonic boom impacts the ground location(s). As shown in FIG. 1B, the sonic boom indicator 140 includes a pressure ray trace line, and includes colors associated with a magnitude (e.g., pressure level) of the sonic boom at corresponding ground locations. For example, the sonic boom 140 is configured to display a red color to represent a high magnitude of the sonic boom, and a gradient of colors to a green color for representing a low magnitude of the sonic boom. The colors may be representative of relative magnitudes of the sonic boom (e.g., red represents highest magnitude for the sonic boom, green represents lowest magnitude for the sonic boom), or absolute magnitudes (e.g., each color is mapped to a specific pressure level value). The sonic boom indicator 140 shown in FIG. 1B is illustrative, and it will be appreciated that various others characteristics of the sonic boom indicator 140 (e.g., brightness, line thickness, line shape, flashing or other intermittent parameters for displaying the sonic boom indicator 140, using solid or dashed lines) may be used to represent the at least one of the pressure level or ground location(s) associated with each sonic boom.

In some embodiments, the sonic boom display 100 includes flight overlay information 150, which may correspond to movement of the platform. For example, the flight overlay information 150 shown in FIG. 1B includes a relative speed indicator indicating a speed of Mach 1.5, a heading indicator indicating a heading of 78 degrees, and a flight plan distance indicator indicating a distance to waypoint WP1.

Figure 2:
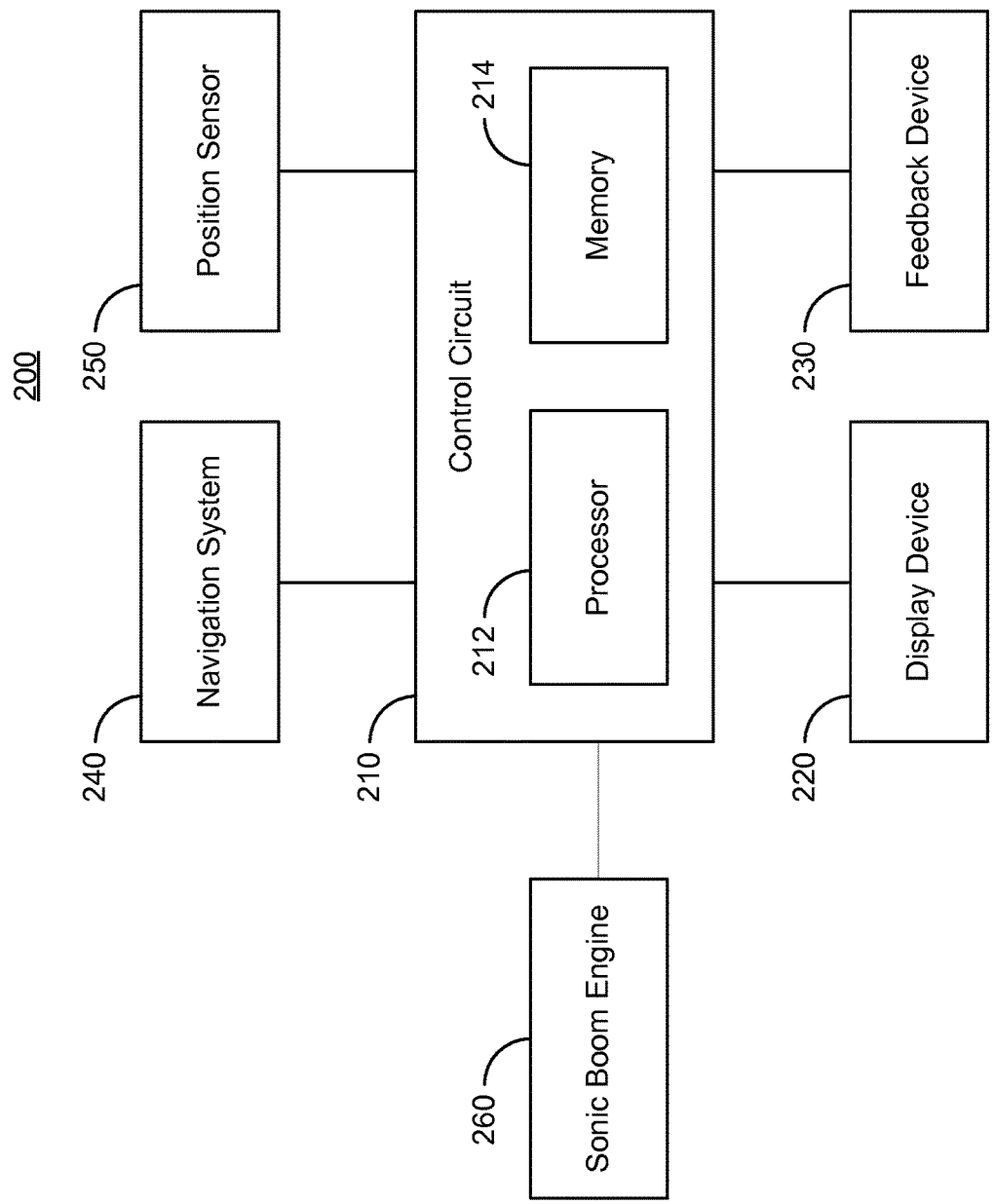
FIG. 2 is a block diagram of an exemplary embodiment of a system for providing feedback associated with sonic booms according to the inventive concepts disclosed herein.

Referring now to FIG. 2, a schematic diagram of a system 200 is shown according to an exemplary embodiment of the inventive concepts disclosed herein. The system 200 includes a control circuit 210, a display device 220, a feedback device 230, a navigation system 240, and a position sensor 250. The control circuit 210 may include or be communicatively coupled to a sonic boom engine 260.

The control circuit 210 (e.g., processing circuit, processing electronics) can include a processor 212 and memory 214. The processor 212 may be implemented as a specific purpose processor, an application specific integrated circuit (ASIC), one or more field programmable gate arrays (FPGAs), a group of processing components, or other suitable electronic processing components. The memory 214 is one or more devices (e.g., RAM, ROM, flash memory, hard disk storage) for storing data and computer code for completing and facilitating the various user or client processes, layers, and modules described in the present disclosure. The memory 214 may be or include volatile memory or non-volatile memory and may include database components, object code components, script components, or any other type of information structure for supporting the various activities and information structures of the inventive concepts disclosed herein. The memory 214 is communicably connected to the processor 212 and includes computer code or instruction modules for executing one or more processes described herein. The memory 214 includes various circuits, software engines, and/or modules that cause the processor 212 to execute the systems and methods described herein.

The display device 220 is configured to display information, such as the sonic boom display 100 described with reference to FIG. 1B. The display device 220 can be or include features of the flight displays 20 described with reference to FIG. 1A. In some embodiments, the display device 220 is a HDD. The display device 220 can display flight plan information. The display device 220 can display an indication of a sonic boom. The indication of the sonic boom may include at least one of a pressure level or a ground location associated with the sonic boom. The indication of the sonic boom may include a plurality of pressure levels associated with a plurality of ground locations of the sonic boom. The display device 220 can display terrain, structures, other platforms (e.g., other aircraft, ground-based platforms, water-based platforms), flight plans, navigation information, weather information, radar information, or other information associated with flight of an airborne platform.

The feedback device 230 is configured to output feedback. The feedback device 230 can be configured to output audio feedback or visual feedback. The feedback device 230 can be configured to control or modulate parameters of the feedback, such as frequency (e.g., frequency/wavelength of light for visual feedback; frequency/wavelength of sound for audio feedback), intermittency (e.g., timing between feedback output), magnitude (e.g., brightness of pixels for visual feedback; amplitude of sound for audio feedback), or color. The feedback device 230 may output feedback according to an intensity (e.g., at least one of frequency, intermittency, or magnitude, where low values of such parameters correspond to relatively low intensity, and high values of such parameters may correspond to relatively high intensity).

In some embodiments, the feedback device 230 includes a haptic feedback device. The haptic feedback device is configured to output haptic feedback. The haptic feedback device can output a mechanical force, a vibration, or otherwise move to provide the haptic feedback. The feedback device 230 can control or modulate parameters such as frequency, magnitude, or intermittency of the haptic feedback.

In some embodiments, the system 200 includes a navigation system 240. The navigation system 240 can be configured to generate, modify, and output navigation information, such as a flight plan. The navigation system 240 can generate a flight plan including at least one waypoint. The navigation system 240 can retrieve the flight plan from a flight plan database. The navigation system 240 can generate or modify the flight plan based on user input.

The system 200 can include a position sensor 250. The position sensor 250 is configured to output an indication of at least one of a position or a velocity of an airborne platform. The position sensor 250 can include at least one of a GPS sensor, an accelerometer, or a gyroscope.

In some embodiments, the sonic boom engine 260 is configured to output an indication of a sonic boom. The indication of the sonic boom may include a pressure value (e.g., pressure level) associated with the sonic boom. The pressure value may correspond to a point in space. The point in space may be a ground location. The sonic boom engine 260 may be configured to calculate and output an indication of the sonic boom based on variables including but not limited to atmospheric variables (e.g., temperature, wind speed, humidity), aircraft trajectory variables (e.g., heading, speed, altitude, flight path angle, acceleration), and terrain and topography variables (e.g., based on a route of a flight). The indication of the sonic boom may be a zero value (e.g., no sonic boom occurs, such as at a particular ground location). The indication of the sonic boom may include at least one of a pressure level and a point in space associated with the pressure level.

The indication of the sonic boom may include Mach cut-off information. For example, the indication of the sonic boom may include at least one of a speed or an altitude associated with a Mach cut-off, at which a sonic boom shock wave generated by an airborne platform is reflected upward through the atmosphere and does not reach the ground.

The control circuit 210 is configured to receive the indication of the sonic boom. The control circuit 210 can cause the display device 220 to display a visual representation of the indication of the sonic boom (e.g., the pressure ray trace lines shown in FIG. 1B). The visual representation may correspond to a pressure or other parameter of the sonic boom at a point in space, such as a ground location where the sonic boom reaches the ground location. The control circuit 210 may receive the ground location from the sonic boom engine 260.

The control circuit 210 may continuously (or regularly) receive the indication of the sonic boom. The control circuit 210 may request the indication of the sonic boom responsive to receiving a trigger condition, such as a trajectory change or a trigger received from a timer configured to intermittently or regularly output the trigger based on a timing condition. The control circuit 210 can be configured to request the indication of the sonic boom as a function of at least one of a position (which may be associated with a complexity of terrain below the airborne platform), velocity, or acceleration of the airborne platform. For example, if the airborne platform is in the vicinity of a populated area, the control circuit may request the indication of the sonic boom more frequently than for an uninhabited area. If the airborne platform is travelling at a relatively high velocity, is increasing in speed, and/or is turning, the control circuit 210 can request the indication of the sonic boom more frequently, which may facilitate representing changes in sonic boom generation relative to movement of the airborne platform.

The control circuit 210 can be configured to request the indication of the sonic boom as a function of a difference between a current speed of the airborne platform and Mach 1 (e.g., a speed greater than or equal to which sonic boom generation occurs). For example, the control circuit 210 can be configured to request the indication of the sonic boom more frequently as the difference between the current speed and Mach 1 decreases, which may allow the system 200 to more quickly represent sonic boom generation at speeds around the Mach 1 threshold.

In some embodiments, the control circuit 210 is configured to at least one of generate the visual representation of the sonic boom, cause the display device 220 to display or update the display of the sonic boom, or cause the feedback device 230 to output feedback associated with the sonic boom responsive to requesting the indication of the sonic boom. In some such embodiments, the timing of sonic boom display and feedback may correspond to the factors described above regarding timing of requesting sonic boom indications (e.g., ground location, position, velocity, acceleration). The control circuit 210 can transmit a trajectory change to the sonic boom engine 260, receive a changed indication of the sonic boom from the sonic boom engine 260 when the sonic boom engine 260 calculates and outputs the changed indication of the sonic boom based on the trajectory change, cause the display device 220 to display a visual representation of the changed sonic boom (e.g., the changed indication of the sonic boom), and cause the feedback device 230 to output feedback associated with the changed sonic boom.

In some embodiments, the control circuit 210 is configured to determine the ground location of the sonic boom. For example, the control circuit 210 may receive the indication of the sonic boom as pressure levels as a function of relative distance from the airborne platform. The control circuit 210 can retrieve a representation of the ground, such as a map including terrain information, and determine the ground location based on the representation of the ground and the indication of the sonic boom.

The control circuit 210 can generate the visual representation to include lines, curves, shading, ray traces, half circles, or other markings representing the sonic boom. The control circuit 210 can modify parameters of the visual representation to represent parameters of the sonic boom. For example, the control circuit 210 can modify parameters such as color, brightness, intermittency (e.g., flashing), or thickness. The parameters may be modified based on the indication of the sonic boom. The control circuit 210 can represent the parameters of the visual representation based on the indication of the sonic boom. For example, the control circuit 210 can generate the visual representation to increase at least one of a brightness or a thickness of the visual representation as the pressure level of the sonic boom increases.

The control circuit 210 can associate a visual representation parameter, such as color, brightness, intermittency, or thickness, with pressure level. For example, the control circuit 210 can include a database mapping pressure level to visual representation parameters (e.g., a first color, such as red, may be associated with relatively high pressure; a second color, such as green, may be associated with relatively low pressure). The database may include a mapping of relative pressure level to visual representation parameters. The database may additionally or alternatively include a mapping of absolute pressure level to visual representation parameters. The control circuit 210 can be configured to determine a relative or absolute pressure level for a specific point in space (e.g., specific ground location) based on the indication of the sonic boom received from the sonic boom engine 260, and retrieve a corresponding visual representation parameter from the database based on the determined pressure level.

The control circuit 210 can be configured to generate the visual representation to include a plurality of markings associated with a plurality of sonic booms. For example, as shown in FIG. 1B, the visual representation may include a plurality of sonic boom indicators 140.

The control circuit 210 can be configured to space the plurality of markings from one another. The control circuit 210 can space the plurality of markings based on a velocity of the airborne platform, such that markings may appear to be closer to one another as the airborne platform accelerates. In some embodiments, the plurality of markings are displayed as a function of time (e.g., at predetermined intervals, such as every 1 second, every 2 seconds, every 3 seconds, every 4 seconds, every 5 seconds). In some embodiments, the plurality of markings are displayed until an expected time of ground impact. For example, the control circuit 210 can be configured to determine the expected time of ground impact for a plurality of sonic booms, and when generating the visual representation, compare a current time to the expected time of ground impact to determine whether to include each sonic boom in the visual representation.

The control circuit 210 can be configured to cause the sonic boom engine 260 to generate indications of sonic booms based on position, velocity, or other parameters transmitted to the sonic boom engine 260. The control circuit 210 can generate the visual representation to include a first marking corresponding to a sonic boom reaching a ground location from a current position of the airborne platform, and a final marking corresponding to a sonic boom reaching a ground location from an expected position of the airborne platform at a future point in time (e.g., seconds or minutes after a current time). The control circuit 210 can predict the expected position based on at least one of a current velocity, a current position, a flight plan, or a trajectory change of the airborne platform. The control circuit 210 can generate the visual representation to retain markings corresponding to sonic booms that have already impacted ground locations for a predetermined time (e.g., 1-10 seconds), which may facilitate representing a trend for sonic boom locations and intensities as a function of time.

The control circuit 210 can be configured to generate the visual representation based on atmosphere information, such as wind velocity. For example, based on a direction and speed of wind, the control circuit 210 can modify a shape of the markings used to represent the sonic boom (e.g., if the wind is blowing right to left, a portion of the marking on a left side of the sonic boom may be made longer than on the right side).

In some embodiments, the control circuit 210 is configured to cause the feedback device 230 to output feedback corresponding to the indication of the sonic boom. In embodiments in which the feedback device 230 includes a haptic feedback device, the control circuit 210 can cause the haptic feedback device to move or otherwise output a force using at least one of a magnitude, frequency, or intermittency corresponding to the indication of the sonic boom. For example, if the pressure level associated with the sonic boom is relatively high, the control circuit 210 can cause the haptic feedback device to oscillate at a relatively high frequency and/or output a relatively high force to resist movement of the haptic feedback device based on input from a remote source, such as a hand of a user.

The control circuit 210 can cause the feedback device 230 to set or modify the feedback based on the ground location. For example, the control circuit 210 can cause the feedback to be increased in magnitude and/or frequency if the ground location is a populated area, as compared to an uninhabited area. The control circuit 210 can also cause the feedback device 230 to set or modify the feedback based on the location of remote platforms, such as other aircraft.

The control circuit 210 may include a database associating indications of sonic booms with feedback parameters. For example, the control circuit 210 may include a database mapping pressure levels to feedback frequency and/or feedback magnitude. The control circuit 210 can be configured to perform a lookup in the database to retrieve at least one of a feedback frequency or a feedback magnitude based on the pressure level of the indication of the sonic boom. The control circuit 210 can be configured to cause the feedback device 230 to output the feedback with at least one of a magnitude or a frequency corresponding to the indication of the sonic boom.

In some embodiments, the control circuit 210 is configured to cause the display device 220 to display a flight plan while displaying the visual representation of the indication of the sonic boom. For example, as shown in FIG. 1B, the sonic boom indicators 140 are displayed while the flight plan waypoints 130 are displayed.

In some embodiments, the control circuit 210 is configured to receive a trajectory change. The trajectory change may be expected (e.g., the trajectory change may be a proposed change to a flight plan, or may be received before the change to the flight plan or to a current trajectory is executed). The trajectory change can be received from the navigation system 240, or from other user interface devices configured to receive flight or navigation instructions (e.g., UI elements 22).

The trajectory change can be received from the feedback device 230. For example, if the feedback device 230 is a haptic feedback device or otherwise configured to move or be moved (e.g., a joystick), the trajectory change can be received as a force applied to the feedback device 230 to move the feedback device 230. In some such embodiments, the feedback device 230 is configured to output flight control instructions (e.g., the feedback device 230 is configured to output haptic feedback and also is a control stick for the airborne platform).

In some embodiments, the feedback device 230 is configured to receive a desired trajectory change (e.g., a trajectory change which may not necessarily be executed by the airborne platform). The control circuit 210 can receive the desired trajectory change from the feedback device 230, request an updated indication of a sonic boom from the sonic boom engine 260 based on the desired trajectory change, and at least one of cause the display device 220 or cause the feedback device 230 to output an updated feedback corresponding to the desired trajectory change. In some such embodiments, the system 200 can be configured to provide visual, audio, and/or haptic feedback indicating how trajectory changes can cause changes in sonic boom generation and impact.

The control circuit 210 can cause the feedback device 230 to set or modify a parameter of the feedback outputted by the feedback device 230 based on the trajectory change. The parameter may include at least one of a magnitude, a frequency, or an intermittency of the feedback. The parameter may be modified to indicate an effect on travel of the airborne platform resulting from the trajectory change. The control circuit 210 can cause the feedback device 230 to set or modify the parameter based on the trajectory change and an indication of a sonic boom associated with the trajectory change. The control circuit 210 can receive the trajectory change and transmit an instruction to the sonic boom engine 260 to generate an updated indication of a sonic boom based on the trajectory change (e.g., the sonic boom engine 260 may receive position and velocity information from the control circuit 210 and generate a new indication of a sonic boom based on the position and velocity information). In some embodiments, at least one of a ground location or a pressure level associated with the sonic boom may change because of the trajectory change. The control circuit 210 can receive the changed at least one of the ground location or pressure level, and cause the feedback device 230 to modify a parameter of the feedback based on the changed at least one of the ground location or pressure level.

In some embodiments, the control circuit 210 is configured to cause the feedback device 230 to output feedback configured to indicate a flight path associated with a relatively low likelihood of sonic boom generation or impact, or relatively low sonic boom pressure levels. The likelihood of sonic boom generation or impact may be associated with a confidence threshold (e.g., 95% confidence that a sonic boom will not be generated or will not impact a ground location). The sonic boom pressure levels may be associated with a pressure threshold (e.g., a pressure threshold corresponding to regulatory requirements; a pressure threshold corresponding to accepted noise levels for inhabited ground locations).

The control circuit 210 can cause the feedback device 230 to control a frequency or magnitude of the feedback as a function of flight path. For example, as a current or expected position or trajectory of the airborne platform changes, the control circuit 210 can request and receive an updated indication of a sonic boom. In some embodiments, the control circuit 210 is configured to retrieve new feedback parameters based on the updated indication of the sonic boom (e.g., from a database associating pressure levels with feedback parameters). In some embodiments, the control circuit 210 is configured to calculate a change in feedback parameters based on a difference between the updated indication of the sonic boom and a previous indication of the sonic boom. For example, the control circuit 210 can calculate a pressure difference between sonic booms and determine a change in feedback parameters based on the pressure difference.

As the control circuit 210 causes the feedback device 230 to update the feedback depending on the indications of sonic booms, the intensity (e.g., frequency, magnitude) of the feedback may change (e.g., magnitude may increase as sonic boom pressure level increases, or vice versa). The control circuit 210 can cause the feedback device 230 to update the feedback in response to a trigger condition. The trigger condition may include receiving a trajectory change. The trigger condition may be a regular or intermittent trigger (e.g., the control circuit 210 can include a timer configured to output the trigger condition as a function of time, such as every second). As the indications of sonic booms change, the feedback device 230 can output feedback consistent with the changed indications of sonic booms, such that a user may explore a decision space for flight path decisions while receiving feedback regarding sonic booms associated with the flight path decisions. In some embodiments, the feedback device 230 provides instantaneous or near-instantaneous haptic feedback regarding how trajectory changes received by the feedback device 230 cause changes to sonic boom impact.

In some embodiments, the control circuit 210 is configured to cause the feedback device 230 to output a specific feedback associated with a flight path that satisfies flight path criteria. The flight path criteria may include a threshold pressure level for a sonic boom. The threshold pressure level may be zero, or may be a nominal level (e.g., a level corresponding to regulatory requirements for sonic boom generation). In some embodiments, the control circuit 210 is configured to cause the feedback device 230 to output feedback at a relatively low intensity (e.g., frequency, magnitude, intermittency) while the flight path satisfies flight path criteria, and at a relatively high intensity if the flight path does not satisfy flight path criteria, or is transitioning from satisfying flight path criteria to not satisfying flight path criteria. For example, if the pressure level associated with sonic booms generated by the airborne platform is increasing from a first value to a second value that is less than the threshold pressure level by a predetermined value, the control circuit 210 can be configured to cause the feedback device 230 to output the feedback at the relatively high intensity responsive to determining that the pressure level is greater than or equal to the second value.

In some embodiments, the control circuit 210 is configured to cause the feedback device 230 to output feedback based on a Mach cut-off. For example, the control circuit 210 can cause the feedback device 230 to output feedback indicating that at least one of a speed or an altitude of the airborne platform (based on a current or expected position and velocity of the airborne platform) satisfies a Mach cut-off criteria. The Mach cut-off criteria may include a two-dimensional space of speed and altitude values at which a sonic boom generated by the airborne platform is reflected, refracted, bent, or otherwise redirected away from ground by the atmosphere. The control circuit 210 can be configured to output feedback indicating a transition from the at least one of the speed or altitude satisfying the Mach cut-off criteria to a speed or an altitude not satisfying the Mach cut-off criteria. For example, the control circuit 210 can be configured to calculate a difference between a current speed of the airborne platform (while the airborne platform is satisfying the Mach cut-off criteria) to a speed of the airborne platform at which the airborne platform would not satisfy the Mach cut-off criteria, and increase the intensity of the feedback as the difference decreases, or if the difference is less than a threshold value. Similarly, the control circuit 210 can output feedback based on altitude, or based on combination of speed and altitude. As will be appreciated, various other feedback schemes may be used to differentiate flight parameters (e.g., speed, altitude, heading) corresponding to desired flight paths, such as flight paths limiting or avoiding sonic booms, and undesired flight paths, such as flight paths likely to cause sonic booms that impact ground locations.

In some embodiments, the control circuit 210 is configured to cause the feedback device 230 to output feedback based on flight plan information. The control circuit 210 can receive the flight plan (e.g., from the navigation system 240). The control circuit 210 can determine at least one of a time, a distance, or a fuel burn rate for travel to a destination based on the flight plan. The control circuit 210 can identify the destination automatically (e.g., identify destination to be a specific waypoint, such as an upcoming waypoint or a final destination waypoint) or based on user input (e.g., user input indicating a selection of the destination). The control circuit 210 can determine the at least one of the time or the fuel burn rate based on executing a flight time algorithm, which may calculate time or fuel burn rate based on distance to the destination, distance along a flight path arc to the destination, a current or expected speed of the airborne platform, an acceleration or deceleration associated with travel to the destination, or other factors for flight time or fuel burn rate calculations. The control circuit 210 can include a database mapping flight plan information to feedback parameters, and retrieve the feedback parameters based on the flight plan information.

In some embodiments, the control circuit 210 is configured to update the feedback based on the flight plan information in response to receiving a trajectory change. For example, if the trajectory change indicates a time to a destination will increase, the control circuit 210 can cause the feedback device 230 to increase an intensity of the feedback.

The control circuit 210 may store a heuristic, policy, or algorithm configured to output feedback parameters as a function of indications of both sonic boom and flight plan information. For example, the control circuit 210 can be configured to cause the feedback device 230 to output feedback representing a blend of feedback corresponding to both sonic boom effects and flight plan effects, such as time, distance, or fuel burn rate. The heuristic, policy, or algorithm can be predetermined, or can be set based on user input.

Figure 3:
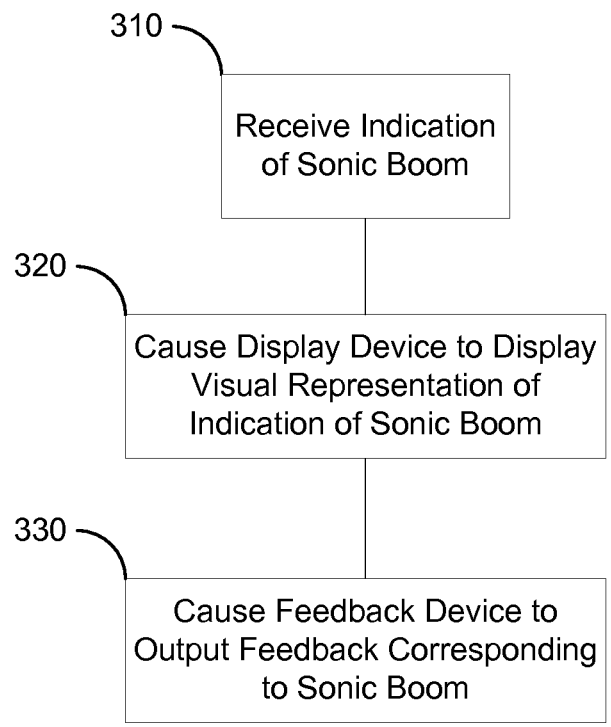
FIG. 3 is a diagram of an exemplary embodiment of a method according to the inventive concepts disclosed herein.

Referring now to FIG. 3, an exemplary embodiment of a method 300 according to the inventive concepts disclosed herein may include the following steps. The method 300 may be performed using various hardware, apparatuses, and systems disclosed herein, such as the aircraft control center 10, the sonic boom display 100, the system 200, and/or components thereof.

A step (310) may include receiving, at a control circuit, an indication of a sonic boom. The indication of the sonic boom may be received from a sonic boom engine, which may be included in or communicatively coupled to the control circuit. The indication of the sonic boom may include at least one of a pressure level or a ground location associated with the sonic boom.

A step (320) may include causing, by the control circuit, a display device to display a visual representation of the indication of the sonic boom. The display device may be a HDD. The visual representation may include curves, lines, ray traces, or other markers configured to represent the indication of the sonic boom. In some embodiments, the control circuit generates the visual representation of the indication of the sonic boom at a ground location of the sonic boom based on the pressure level.

A step (330) may include causing, by the control circuit, a feedback device to output feedback corresponding to the sonic boom. The feedback device may include a visual feedback device, an audio feedback device, or a haptic feedback device. The control circuit can cause the feedback device to output feedback having at least one of a frequency, a magnitude, an intermittency, or a color corresponding to the indication of the sonic boom.

In some embodiments, the control circuit receives a flight plan. The control circuit determines at least one of a time or a fuel burn rate for travel to a destination based on the flight plan. The control circuit causes the feedback device to output the feedback further based on the at least one of the time or fuel burn rate.

As will be appreciated from the above, systems and methods for sonic boom display and feedback according to embodiments of the inventive concepts disclosed herein may improve operation of aircraft and other platforms by providing feedback (e.g., visual feedback, audio feedback, haptic feedback) on the impact of sonic booms generated by the platforms.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
   a display device;
   a haptic feedback device coupled to the display device; and
   a control circuit comprising a feedback parameter database configured to map a feedback parameter to at least one pressure level of a plurality of pressure levels, the feedback parameter comprising at least one of a magnitude, a frequency, or an intermittency, the control circuit configured to:
   receive an indication of a sonic boom including a pressure level of the sonic boom;
   cause the display device to display a visual representation of the indication of the sonic boom;
   retrieve, from the feedback database, the feedback parameter corresponding to the pressure level of the sonic boom; and
   cause the haptic feedback device to output feedback corresponding to the pressure level of the sonic boom by controlling the feedback parameter by which the haptic feedback device outputs a mechanical force or vibrates responsive to the indication of the sonic boom.

2. The system of claim 1, wherein control circuit is further configured to determine a ground location of the sonic boom, and generate the visual representation of the indication of the sonic boom at the ground location based on the pressure level.

3. The system of claim 1, wherein the indication of the sonic boom includes a ground location, and the control circuit is configured to generate the visual representation of the indication of the sonic boom at the ground location based on the pressure level.

4. The system of claim 1, wherein the control circuit is configured to cause the display device to display a flight plan while displaying the visual representation of the indication of the sonic boom.

5. The system of claim 1, wherein the control circuit is configured to receive a trajectory change, transmit an indication of the trajectory change to a sonic boom engine, receive an updated indication of a sonic boom based on the sonic boom engine processing the trajectory change, and cause the haptic feedback device to modify at least one of a magnitude or a frequency of the feedback based on the updated indication of the sonic boom.

6. The system of claim 5, wherein the haptic feedback device is configured to receive the trajectory change.

7. The system of claim 1, wherein the control circuit is configured to receive a flight plan, determine at least one of a time or a fuel burn rate for travel to a destination based on the flight plan, and cause the haptic feedback device to output the feedback further based on the at least one of the time or fuel burn rate.

8. An airborne platform, comprising:
a flight navigation system configured to store a flight plan;
a display device;
a feedback device comprising at least one of a haptic feedback device or a tactile feedback device; and
a control circuit comprising a feedback parameter database configured to map at least one feedback parameter to at least one pressure level of a plurality of pressure levels, the at least one feedback parameter comprising at least one of a magnitude, a frequency, or an intermittency, wherein the control circuit is configured to:
receive an indication of a sonic boom including a pressure level of the sonic boom;
cause the display device to display a visual representation of the indication of the sonic boom;
retrieve, from the feedback database, the at least one feedback parameter corresponding to the pressure level of the sonic boom; and
cause the haptic feedback device to output feedback corresponding to the pressure level of the sonic boom by controlling the at least one feedback parameter by which the haptic feedback device outputs a mechanical force or vibrates responsive to the indication of the sonic boom.

9. The airborne platform of claim 8, wherein the control circuit is configured to cause the display device to display the flight plan while displaying the visual representation of the indication of the sonic boom.

10. The airborne platform of claim 8, wherein the indication of the sonic boom includes a pressure level.

11. The airborne platform of claim 8, wherein the control circuit is configured to receive an expected trajectory change and cause the feedback device to modify at least one of a magnitude or a frequency of the feedback based on the expected trajectory change.

12. The airborne platform of claim 8, wherein the control circuit is configured to determine at least one of a time or a fuel burn rate for travel to a destination based on the flight plan, and cause the feedback device to output the feedback further based on the at least one of the time or fuel burn rate.

13. The airborne platform of claim 8, wherein the feedback device is coupled to the display device.

14. The airborne platform of claim 8, wherein the display device is at least one of a primary flight display, a head down display, or a head up display.

15. A method, comprising:
receiving, at a control circuit, an indication of a sonic boom including a pressure level of the sonic boom;
causing, by the control circuit, a display device to display a visual representation of the indication of the sonic boom;
retrieving, from a feedback database, at least one feedback parameter comprising at least one of a magnitude, a frequency, or an intermittency corresponding to the pressure level of the sonic boom; and
causing, by the control circuit, a haptic feedback device to output feedback corresponding to the pressure level of sonic boom by controlling the at least one feedback parameter by which the haptic feedback device outputs a mechanical force or vibrates responsive to the indication of the sonic boom.

16. The method of claim 15, further comprising generating, by the control circuit, the visual representation of the indication of the sonic boom at a ground location of the sonic boom based on the pressure level.

17. The method of claim 15, further comprising:
receiving, at the control circuit, an expected trajectory change; and
causing, by the control circuit, the feedback device to modify at least one of a magnitude or a frequency of the feedback based on the expected trajectory change.

18. The method of claim 15, further comprising:
receiving a flight plan at the control circuit;
determining, by the control circuit, at least one of a time or a fuel burn rate for travel to a destination based on the flight plan; and
causing, by the control circuit, the haptic feedback device to output the feedback further based on the at least one of the time or fuel burn rate.

* * * * *